2,870,219

DIFLUOROVINYL METHYL ETHER

Cyril Woolf, Morristown, N. J., assignor to Allied Chemical Corporation, a corporation of New York No Drawing. Application May 20, 1957
Serial No. 660,085

5 Claims. (Cl. 260—614)

This invention is directed to difluorochloroacetaldehyde methylate, $CClF_2.CH(OH).O.CH_3$; 1,2-dichloro-2-difluoroethyl methyl ether, $CClF_2.CHCl.O.CH_3$; and 2-difluorovinyl methyl ether, $CF_2=CH.O.CH_3$, as new compounds, and to processes for making the same.

A major objective of the invention lies in provision of a polymerizable fluorinated vinyl ether characterized by the absence of fluorine attached to the vinyl group carbon atom which is adjacent the oxygen. It has been found that such compound is markedly adaptable for use as a monomer and provides a source of monomeric starting material for manufacture of relatively low molecular weight polymers particularly adaptable for use in the manufacture of adhesives, and as copolymrs in production of synthetic rubbers. Because of the presence of the fluorine in the 2-difluorovinyl methyl ether, and the total absence of chlorine and the absence of fluorine attached to the carbon atom adjacent the oxygen, the 2-difluorovinyl methyl ether affords the advantages of forming polymeric products characterized by their increased stability to hydrolytic attack, such as resistance to the action of aqueous sulfuric and similar acids.

The invention includes the discovery of 1,2-dichloro-2-difluoroethyl methyl ether, an intermediate which may be readily dechlorinated or vinylated to form the ultimate monomeric $CF_2=CH.O.CH_3$ product of the invention; the discovery of difluorochloroacetaldehyde methylate, an intermediate which may be easily chlorinated to form the $CClF_2.CHCl.O.CH_3$ intermediate; and the discovery that a particular fluorinated primary starting material $CClF_2.CHO$, a compound not heretofore appearing in the art, has a molecular structure which facilitates manufacture, by a relatively easily controlled procedural route, of monomeric 2-difluorovinyl methyl ether which is halogenated only with fluorine and contains no fluorine in association with the carbon atom immediately adjacent the oxygen. Hence, processwise, the invention includes the discovery of the adaptability of a particular fluorinated primary starting material of certain structure, and a combination of process steps by practice of which the preferred product of the invention, 2-difluorovinyl methyl ether, may be obtained in good yields.

In general, difluorochloroacetaldehyde $CClF_2.CHO$, the primary starting material utilized in practice of the present invention, may be made by reacting $CClF_2.COCl$ and hydrogen in the presence of a palladium catalyst at elevated temperatures. Following is an example illustrating manufacture of difluorochloroacetaldehyde.

Example A

For preparation of the palladium catalyst, 14 mesh Columbia 6G activated carbon was mixed with an aqueous palladium chloride solution in quantity such that 0.5 part by weight, calculated as elemental palladium, was present for each 110 parts of carbon. Hence, 0.85 g. of $PdCl_2$ (17 g. of 5 w./w. percent palladium chloride solution), were added to 100 g. of carbon. The requisite quantity of 5 w./w. percent $PdCl_2$ solution was diluted to 150 ml. with water before adding the carbon. After standing for two hours with occasional shaking, the impregnated carbon was decanted and oven-dried at 120° C. 150 ml. of the catalyst were charged into a one-inch I. D. tubular nickel reactor heated externally over 36 inches of length by an electric furnace provided with automatic temperature control. The catalyst was disposed in a central 12 inch long length of the reactor. Reactor temperature, as measured by an internally disposed thermocouple, was raised to 300° C. and maintained at this temperature for two hours while passing hydrogen at the rate of 12 liters/hour. This procedure completed the drying of the catalyst and reduced the $PdCl_2$ to Pd.

Reaction zone temperature was lowered to about 150° C. During 12 hours, 913 g. of $CClF_2.COCl$ (6.12 moles) and 231 liters of hydrogen (9.65 moles) were passed simultaneously, at about constant rate, through the reactor. Reaction was moderately exothermic, and temperature was maintained at about 150–160° C. throughout the run. Exit products from the reactor were passed through a glass flask cooled by acetone/Dry-Ice. Residual hydrogen and HCl discharged from the flask were water scrubbed, and unreacted hydrogen, as measured by a wet gas-meter, amounted to 120 liters, 5.2 moles. The material trapped in the acetone/Dry-Ice cooled flask was fractionally distilled at atmospheric pressure using an acetone/Dry-Ice cooled still head to provide appropriate reflux, the still being protected against the entry of water by Drierite. Dissolved HCl was disengaged first and discharged through the associated water scrubber. A total of 5.20 mols of chloride ion was found by titration in the scrub water. After disengagement of HCl, a first fraction of 525 g. boiling substantially within the range of about 18–30° C. was obtained leaving a first still residue of about 130 g. The first fraction was redistilled and there was recovered a second fraction of 355 g. of $CClF_2.CHO$ having a boiling point of 17.8° C., and a second still residue of 162 g. The first still residue was redistilled, and there was recovered a third fraction of 53 g. of $CClF_2.CHO$ having a boiling point of 17.8° C., affording a total of 408 g. of recovered $CClF_2.CHO$ in liquid form.

Practice of the process aspects of the invention broadly comprise converting $CClF_2.CHO$ to $$CClF_2.CH(OH).O.CH_3$$

chlorinating the latter to form $CClF_2.CHCl.O.CH_3$, and then vinylating the $CClF_2.CHCl.O.CH_3$ by removal of chlorine to form $CF_2=CH.O.CH_3$.

The difluorochloroacetaldehyde methylate intermediate may be prepared by incorporating difluorochloroacetaldehyde, B. P. 17.8° C., with anhydrous methanol. For example, the $CClF_2.CHO$ may be added either as a liquid or vapor to liquid methanol. Considerable heat is evolved, and agitation during reaction is desirable to assist in dissipation of reaction heat to a cooling medium such as cold water or ice-water externally applied. Since reaction of $CClF_2.CHO$ and methanol is substantially instantaneous, temperature of reaction may be anything, e. g. 60–64° C., sufficiently below the boiling point of methanol to prevent vaporization and loss of the same. However, low temperatures facilitate reaction control, and while any economic low temperature down to say minus 20° C. may be utilized, preferred reaction temperatures lie in the range of zero-50° C. Reaction apparently proceeds in accordance with $$CClF_2.CHO + CH_3OH \rightarrow CClF_2.CH(OH).O.CH_3$$

On completion of incorporation of the acetaldehyde and methanol the resulting reaction product may be fractionally distilled. A fore-fraction, boiling up to about 70° C. at atmospheric pressure, removes any excess methanol, and thereafter the difluorochloroacetaldehyde methylate fraction may be recovered. This material is a colorless liquid having a boiling point of 108–109° C.

The difluorochloroacetaldehyde methylate may be converted to the chlorinated CClF₂.CHCl.O.CH₃ intermediate by subjecting the latter to the action of thionyl chloride, SOCl₂, reaction of the methylate and the chloride being carried out under conditions to form $$CClF_2.CHCl.O.CH_3$$

Reaction is preferably effected in the presence of a suitable organic base capable of reacting with HCl by-product to form the hydrochloride of such base. Reaction is carried out preferably also in the presence of a suitable inert liquid diluent such as anhydrous benzene, anhydrous ether, petroleum "ether" and anhydrous xylene, the quantity of diluent employed being such as to facilitate provision of a readily agitatable reaction mass. Thionyl chloride is utilized in preferably a small excess of stoichiometric quantities. Any organic nitrogen base, which is capable of reacting with HCl to form the base hydrochloride and which is non-reactive with the aldehyde methylate, that is, a base characterized by absence of hydrogen atoms attached to basic nitrogen atom may be employed. Suitable bases include for example pyridine, dimethylaniline, and diethylaniline. The diluent benzene and the base may be charged into an agitated vessel. For best yields, preferably the methylate may be fed into the reaction vessel and subsequently the thionyl chloride is charged gradually. Alternatively, the thionyl chloride may be added to the mixture of benzene and base, followed by gradual addition of the methylate. Temperatures above about 60° C. tend to induce side reactions and decomposition. Reaction temperatures are ordinarily lower and preferably lie in the range of about minus 10 up to plus 15° C. Reaction appears to proceed in accordance with $$CClF_2.CH(OH).O.CCl_3 + SOCl_2 \rightarrow$$
$$CClF_2.CHCl.O.CH_3 + HCl + SO_2$$

On completion of reaction, the reacted mass may be poured on ice to remove precipitated base hydrochloride and hydrolyze excess thionyl chloride. A subjacent oily layer is former. After separation, this layer may be water-washed, dried over e. g. sodium sulfate, and fractionally distilled. The material subjected to distillation comprises essentially liquid diluent and the desired chloroether. A fore-fraction boiling up to about 100° C. separates out liquid diluent when the latter boils below the ether. Thereafter a fraction which may boil in the range of 100–105° C. comprises crude 1,2-dichloro-2-difluoroethyl methyl ether. Redistillation produces the CClF₂.CHCl.O.CH₃ intermediate which is a colorless liquid having a boiling point of 102–103° C.

Vinylization of CClF₂.CHCl.O.CH₃ by dechlorination may be carried out by subjecting the CClF₂.CHCl.O.CH₃ to the action of metallic zinc while in a liquid reaction medium such as anhydrous ethyl alcohol, anhydrous ethers such as dioxane, diethyl and diamyl ethers, and preferably anhydrous methanol. Dechlorination appears to proceed in accordance with the following $$CClF_2.CHCl.O.CH_3 + Zn \rightarrow CF_2=CH.O.CH_3 + ZnCl_2$$

Zinc is utilized in approximately stoichiometric quantities, the inert reaction medium such as anhydrous methanol may be employed in such an amount as to maintain all the ZnCl₂ formed in solution. The reactor may be connected with a fractionating column provided with a reflux condenser. Initial pot temperature may be e. g. 40–50° C. The system may be maintained at total reflux during initial addition of CClF₂.CHCl.O.CH₃ until the desired product concentrates at the top of the fractionating column as indicated by lowering reflux temperature to 22–23° C. Thereafter, difluorovinyl methyl ether, a colorless liquid boiling at 22.–22.5° C., may be continuously recovered by distilling at about the same rate as the CClF₂.CHCl.O.CH₃ starting material is added to the reactor.

In the following examples parts are by weight, and yield denotes percent by weight of product recovered based on the amount of product theoretically obtainable from the organic starting material charged.

*Example 1.*—255 pts. of CClF₂CHO, B. P. 17.8° C., were distilled as condensed liquid phase into an ice cooled reactor containing 100 pts. of anhydrous methanol. Reaction temperature was about 10° C. The reaction product, spontaneously formed with evolution of some heat, was thereafter fractionally distilled at substantially atmospheric pressure. After removing a fore-fraction comprising the excess of methanol, 312 pts. of material identified by analysis to be difluorochloroacetaldehyde methyltae, CClF₂.CH(OH).O.CH₃, a colorless liquid, B. P. 108–109° C. at atmospheric pressure, were recovered, representing a yield of 96% of theory.

*Example 2.*—87 pts. of pyridine, 200 pts. of anhydrous benzene and 146.5 pts. of CClF₂.CH(OH).O.CH₃, made as described in Example 1, were charged into a three-necked, agitated reactor. During a period of about 30 minutes, 131 pts. of thionyl chloride, SOCl₂, were added to the reactor which was maintained in the range of zero–8° C. The reaction mixture was agitated for an additional hours at about 10° C., and then poured onto ice. The subjacent oily layer which formed was separated and washed twice with small amounts of water. After drying over sodium sulfate, the oil was fractionally distilled, and there were recovered about 145 pts. of a fraction boiling at atmospheric pressure in the range of 101–105° C. and containing about 130 pts. boiling at atmospheric pressure in the range of 102–103° C. and identified by analysis to be CClF₂.CHCl.O.CH₃. On the basis of the methylate charged, yield was about 80%.

*Example 3.*—266.6 pts. N-N'-dimethyl aniline, 350 pts. dry benzene, and 293.0 pts. CClF₂.CH(OH).O.CH₃, made in accordance with Example 1, were charged to an agitated reactor as in Example 2. 262 pts. of thionyl chloride were added over a period of about 30 minutes while maintaining reaction temperature at in the range of about minus 3 to zero° C. The reaction product was added to ice water and the oil layer recovered and treated as in Example 2. 264 pts. of CClF₂CHCl.O.CH₃ were obtained representing an 80% yield based on methylate charged.

*Example 4.*—160 pts. of methanol and 65 pts. of finely divided zinc were stirred in a reactor connected to a fractionating column provided with a variable take-off still head cooled by acetone-Dry Ice mixture. The methanol-Zn system was heated to pot temperature of about 60° C. while slowly adding 165 pts. of $$CF_2Cl.CHCl.O.CH_3$$

made as demonstrated in Examples 2 and 3, at a substantially constant rate. When reflux temperature in the still head reached 22° C., product was removed at a rate approximately equal to the input of the chloroether, this procedure being preferred in order to minimize possibility of breaking the double bond. During about two hours, 61 pts. of a colorless liquid boiling at 22.–22.5° C. at atmospheric pressure and identified by analysis to be difluorovinyl methyl ether, CF=CH.O.CH₃ were obtained.

*Example B*

The following illustrates use of the 2-difluorovinyl methyl ether of the invention as a monomer. A closed glass container was charged with 42 parts of difluorodichloromethane and 9.5 parts of 2-difluorovinyl methyl ether. These materials were then cooled to −78° C. and 12 parts of boron trifluoride gas was bubbled through the solution at the rate of 0.2 part of boron trifluoride per minute. The reaction mass was allowed to stand and react for an additional 30 minutes at this temperature and the difluorodichloromethane was then evaporated from the reaction product. The reaction product was then agitated and contacted with anhydrous ammonia for 15 minutes which reacted with the residual boron trifluoride. Water was then added to the product to precipitate the polymer. The polymer layer was then separated and washed well with water and thereafter dried at 105° C. A yield of 5 parts of polymer was obtained softening at about 50° C. and soluble in acetone and benzene. This polymer contained 39.0% carbon, 41.2% fluorine, 4.1% hydrogen and 15.7% oxygen and had molecular weight of about 4000–5000. It is useful as a strengthening impregnant for paper (to increase wet strength thereof) or textiles by dissolving in solvent such as acetone, and applying to such material either by passing the paper or textile web through a bath of such solution or by roller coating, and thereafter evaporating the solvent.

Product and process illustrated in Example A are more fully described and claimed in Woolf copending application Serial No. 660,070, filed May 20, 1957. The subject matter of Example B is more fully described and claimed in Gordon and Woolf copending application Serial No. 660,069, filed May 20, 1957.

I claim:
1. The process for making 2-difluorovinyl methyl ether which comprises subjecting $CClF_2.CHO$ to the action of methanol while maintaining temperature below about 60° C. thereby to form $CClF_2.CH(OH).O.CH_3$ and recovering the latter from the resulting reaction mass; subjecting said $CClF_2.CH(OH).O.CH_3$ to the action of thionyl chloride at temperature below about 60° C. while in an inert liquid diluent in quantity sufficient to provide a readily agitatable reaction mass and while in the presence of an organic nitrogen amino base non-reactive with the aldehyde methylate and capable of reacting with released HCl to form the base hydrochloride thereby to produce $CClF_2.CHCl.O.CH_3$, recovering $CClF_2.CHCl.O.CH_3$ from the resulting reaction mass; subjecting said

$$CClF_2.CHCl.O.CH_3$$

to the action of metallic zinc while in a liquid reaction medium and in quantity sufficient to convert said $CClF_2.CHCl.O.CH_3$ to $CF_2=CH.O.CH_3$, and recovering $CF_2=CH.O.CH_3$ from the resulting reaction mass.

2. The process of claim 1 in which reaction of $CClF_2.CHO$ and methanol is effected at temperature in the range of zero–50° C., and reaction of $$CClF_2.CH(OH).O.CH_3$$

and thionyl chloride is effected at temperatures in the range of minus 10–plus 15° C.

3. Difluorochloroacetaldehyde methylate, $$CClF_2.CH(OH).O.CH_3$$

4. Difluorodichloroethyl methyl ether, $$CClF_2.CHCl.O.CH_3$$

5. Difluorovinyl methyl ether, $CF_2=CH.O.CH_3$.

References Cited in the file of this patent
UNITED STATES PATENTS

| | | |
|---|---|---|
| 2,668,182 | Miller | Feb. 2, 1954 |
| 2,684,959 | Rearick | July 27, 1954 |
| 2,803,665 | Miller et al. | Aug. 20, 1957 |

FOREIGN PATENTS

| | | |
|---|---|---|
| 583,874 | Great Britain | Jan. 1, 1947 |

OTHER REFERENCES

Ellison et al.: Chem. Abs., vol. 48 (1954), p. 7391.